US008467724B2

(12) United States Patent  (10) Patent No.: US 8,467,724 B2
Christensen et al.  (45) Date of Patent: *Jun. 18, 2013

(54) BROADCAST RESPONSE SYSTEM

(75) Inventors: Kelly M. Christensen, Fallbrook, CA (US); Barry D. Thomas, West Hills, CA (US); Thomas J. Smyth, North Hollywood, CA (US)

(73) Assignee: StratosAudio, Inc., Kirkland, WA (US)

( * ) Notice: Subject to any disclaimer, the term of this patent is extended or adjusted under 35 U.S.C. 154(b) by 335 days.

This patent is subject to a terminal disclaimer.

(21) Appl. No.: 11/562,300

(22) Filed: Nov. 21, 2006

(65) Prior Publication Data

US 2007/0155311 A1  Jul. 5, 2007

Related U.S. Application Data

(63) Continuation of application No. 11/203,556, filed on Aug. 12, 2005, which is a continuation of application No. 09/953,335, filed on Sep. 13, 2001, now Pat. No. 6,957,041.

(60) Provisional application No. 60/232,333, filed on Sep. 13, 2000.

(51) Int. Cl.
 *H04B 7/24* (2006.01)
(52) U.S. Cl.
 USPC ......... 455/39; 705/2; 705/26; 725/34; 725/58
(58) Field of Classification Search
 USPC ........................................... 455/39
 See application file for complete search history.

(56) References Cited

U.S. PATENT DOCUMENTS

| 4,926,255 A | 5/1990 | Von Kohorn |
| 5,134,719 A | 7/1992 | Mankovitz |
| 5,303,393 A | 4/1994 | Noreen et al. |
| 5,438,355 A | 8/1995 | Palmer |

(Continued)

FOREIGN PATENT DOCUMENTS

| CA | 2 316 925 | 7/1999 |
| DE | 44 27 046 A1 | 2/1996 |

(Continued)

OTHER PUBLICATIONS

"Sirius to Add 'Instant Buy' Button". Mar. 13, 2000, Twice, V 15, n 7, p. 28.

(Continued)

*Primary Examiner* — Ajibola Akinyemi
(74) *Attorney, Agent, or Firm* — Knobbe, Martens, Olson & Bear, LLP

(57) ABSTRACT

A broadcast response system provides, e.g., a radio broadcast listener with the ability to obtain media content such as music or speech while listening to the radio. The user can respond to items in the radio broadcast such as advertisements, fund raising drives, or interactive listener polls during the broadcast. Data such as song title and artist, author or publisher and the IP address for the location where the digital version of the content is stored, can be transmitted using, e.g., the RBDS/RDS data stream. A reference number representing song title and artist, author or publisher and the IP address for the location where the digital version of the content is stored can also be employed for ease of implementation. This reference number can reside in a lookup table to be accessed by broadcast response server.

36 Claims, 6 Drawing Sheets

U.S. PATENT DOCUMENTS

| | | | |
|---|---|---|---|
| 5,444,769 | A | 8/1995 | Koen et al. |
| 5,539,635 | A | 7/1996 | Larson, Jr. |
| 5,548,828 | A | 8/1996 | Kozaki et al. |
| 5,557,541 | A | 9/1996 | Schulhof et al. |
| 5,579,537 | A | 11/1996 | Takahisa |
| 5,661,787 | A | 8/1997 | Pocock |
| 5,708,478 | A | 1/1998 | Tognazzini |
| 5,752,159 | A | 5/1998 | Faust et al. |
| 5,857,156 | A | 1/1999 | Anderson |
| 5,872,589 | A | 2/1999 | Morales |
| 5,903,617 | A * | 5/1999 | Kamalski ............... 375/354 |
| 5,905,865 | A | 5/1999 | Palmer et al. |
| 5,907,793 | A | 5/1999 | Reams |
| 5,991,601 | A | 11/1999 | Anderson |
| 5,991,737 | A | 11/1999 | Chen |
| 6,036,086 | A | 3/2000 | Sizer, II et al. |
| 6,098,106 | A | 8/2000 | Philyaw et al. |
| 6,202,210 | B1 | 3/2001 | Ludtke |
| 6,286,140 | B1 | 9/2001 | Ivanyi |
| 6,446,262 | B1 * | 9/2002 | Malaure et al. ............ 725/141 |
| 6,463,469 | B1 | 10/2002 | Yavitz |
| 6,473,792 | B1 | 10/2002 | Yavitz et al. |
| 6,507,727 | B1 | 1/2003 | Henrick |
| 6,547,041 | B2 | 4/2003 | Carlsson |
| 6,578,047 | B1 | 6/2003 | Deguchi |
| 6,611,201 | B1 | 8/2003 | Bishop et al. |
| 6,658,232 | B1 | 12/2003 | Johnson |
| 6,701,355 | B1 * | 3/2004 | Brandt et al. ............. 709/219 |
| 6,725,022 | B1 | 4/2004 | Clayton et al. |
| 6,829,486 | B2 | 12/2004 | McKenna et al. |
| 6,928,423 | B1 | 8/2005 | Yamanaka |
| 6,941,154 | B1 | 9/2005 | Ritter |
| 6,957,041 | B2 | 10/2005 | Christensen et al. |
| 6,970,886 | B1 * | 11/2005 | Conwell et al. ............ 1/1 |
| 6,990,312 | B1 | 1/2006 | Gioscia et al. |
| 7,110,714 | B1 | 9/2006 | Kay et al. |
| 7,190,971 | B1 | 3/2007 | Kawamoto |
| 7,266,343 | B1 | 9/2007 | Yli-juuti et al. |
| 7,299,194 | B1 | 11/2007 | Manganaris et al. |
| 7,415,430 | B2 | 8/2008 | Christensen et al. |
| 7,647,609 | B2 * | 1/2010 | Wachtfogel et al. ............ 725/34 |
| 7,788,693 | B2 * | 8/2010 | Robbins ..................... 725/58 |
| 2002/0046407 | A1 * | 4/2002 | Franco ..................... 725/110 |
| 2002/0049037 | A1 | 4/2002 | Christensen et al. |
| 2002/0133824 | A1 * | 9/2002 | Mensch ..................... 725/62 |
| 2003/0097338 | A1 | 5/2003 | Mankovich et al. |
| 2003/0208756 | A1 * | 11/2003 | Macrae et al. ............. 725/34 |
| 2005/0021744 | A1 | 1/2005 | Haitsuka et al. |
| 2005/0287972 | A1 | 12/2005 | Christensen et al. |
| 2007/0156457 | A1 * | 7/2007 | Brown ..................... 705/2 |
| 2009/0104870 | A1 | 4/2009 | Christensen et al. |
| 2009/0104872 | A1 | 4/2009 | Christensen et al. |
| 2009/0192916 | A1 * | 7/2009 | Casper ..................... 705/26 |

FOREIGN PATENT DOCUMENTS

| | | |
|---|---|---|
| DE | 196 27 308 A1 | 1/1998 |
| EP | 0 713 335 A2 | 5/1996 |
| JP | 08-139624 | 5/1996 |
| JP | 10-135855 | 5/1998 |
| JP | 2000292182 A | 10/2000 |
| KR | 10-1996-0033096 | 9/1996 |
| KR | 10-1998-0078248 | 11/1998 |
| WO | WO 90/00847 | 1/1990 |
| WO | WO92/14222 | 8/1992 |
| WO | WO94/02909 | 2/1994 |
| WO | WO97/21291 | 6/1997 |
| WO | WO97/42724 A1 | 11/1997 |
| WO | WO97/45814 | 12/1997 |
| WO | WO 99/18518 | 4/1999 |
| WO | WO99/35771 | 7/1999 |
| WO | WO99/35809 | 7/1999 |
| WO | WO99/43109 | 8/1999 |
| WO | WO 00/19662 | 4/2000 |
| WO | WO01/01331 | 1/2001 |
| WO | WO01/57759 | 8/2001 |
| WO | WO02/23773 | 2/2002 |

OTHER PUBLICATIONS

"Bookmark Your World", 1999-2000 Xenote, www.xenote.com.
Jan. 25, 2000, Showcase 2000—Xenote Press Release re Xenote iTag, www.xenote.com/html/press/releases.html.
International Search Report dated Sep. 13, 2001.
European Patent Office Examination Report dated Oct. 17, 2005.
European Patent Office Examination Report dated Feb. 21, 2007.
U.S. Appl. No. 10/806,084, including its patent prosecution history and the Office Actions mailed on Apr. 12, 2007 and Nov. 2, 2007, Kelly M. Christensen.
U.S. Appl. No. 11/203,557, including its patent prosecution history and the Office Actions mailed on Dec. 28, 2006, Mar. 6, 2007, and Nov. 8, 2007, filed Dec. 29, 2005, Kelly M. Christensen.
Office Action in Korean App. No. 10-2003-7003701, mailed on Sep. 20, 2007 (both English and Korean versions).
Australian App. No. 2007200471, including its prosecution history, and the Office Actions mailed on Oct. 15, 2008 and Jan. 12, 2009.
Office Action in Korean App. No. 10-2003-7003701, mailed on Feb. 29, 2008 (both English and Korean versions).
U.S. Appl. No. 10/806,084, including its prosecution history and the Office Actions mailed on Apr. 12, 2007, Nov. 2, 2007, Sep. 16, 2008 and Apr. 8, 2009, filed Mar. 22, 2004, Christensen et al.
Office Action in Korean App. No. 10-2008-7031275, mailed on May 4, 2009 (both English and Korean versions).
Office Action in Korean App. No. 10-2008-7001677, mailed on May 23, 2008 (both English and Korean versions).
Office Action in Japanese App. No. 2002-527094, mailed on Feb. 24, 2010 (both English and Japanese versions).
Office Action in Canadian App. No. 2,421,165, mailed on Feb. 1, 2010.
U.S. Appl. No. 12/334,411, filed Dec. 12, 2008, Christensen et al.
U.S. Appl. No. 12/366,483, filed Feb. 5, 2009, Christensen et al.
U.S. Appl. No. 12/366,535, filed Feb. 5, 2009, Christensen et al.
U.S. Appl. No. 12/334,400, filed Dec. 12, 2008, Christensen et al.
Office Action in Korean App. No. 10-2008-7031275, mailed on Jan. 28, 2010 (both English and Korean versions).
Office Action in Korean App. No. 10-2010-7019126, mailed on Nov. 9, 2010 (both English and Korean versions).
Final Office Action in Korean App. No. 10-2008-7031275, mailed on Dec. 30, 2010.
Final Office Action in Japanese App. No. 2002-527094, mailed on Dec. 21, 2010 (both English and Japanese versions).
Final Office Action in Japanese App No. 2002-527094, mailed on Sep. 6, 2011 (both English and Japanese Versions).
Office Action in Korean App. No. 10-2011-7010599, mailed on Sep. 8, 2011 (both English and Korean version).
Final Office Action in Korean App. No. 10-2008-7031275, mailed on Sep. 29, 2011 (both English and Korean versions).
U.S. Appl. No. 12/897,509, filed Oct. 4, 2010, Christensen et al.

* cited by examiner

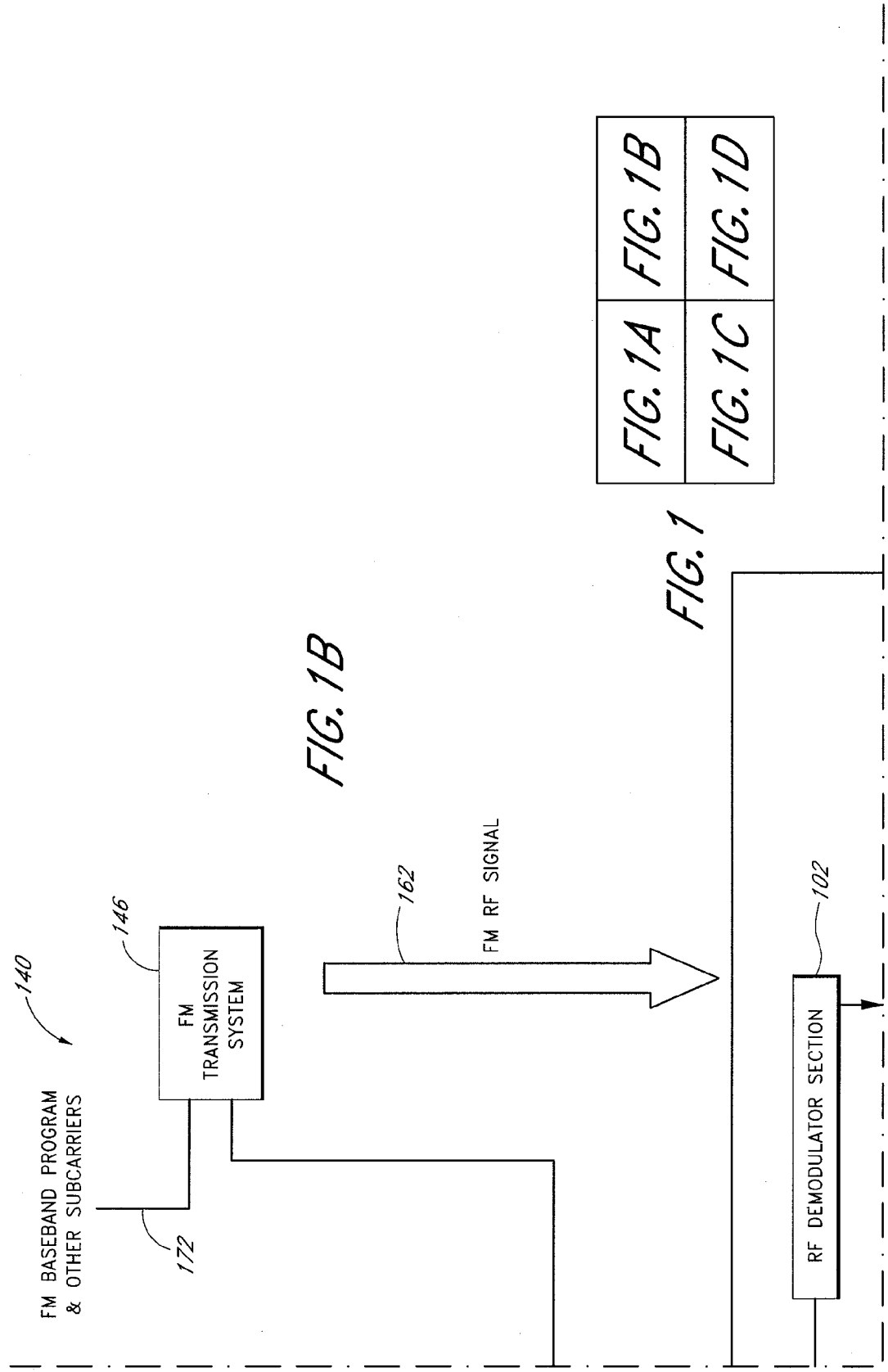

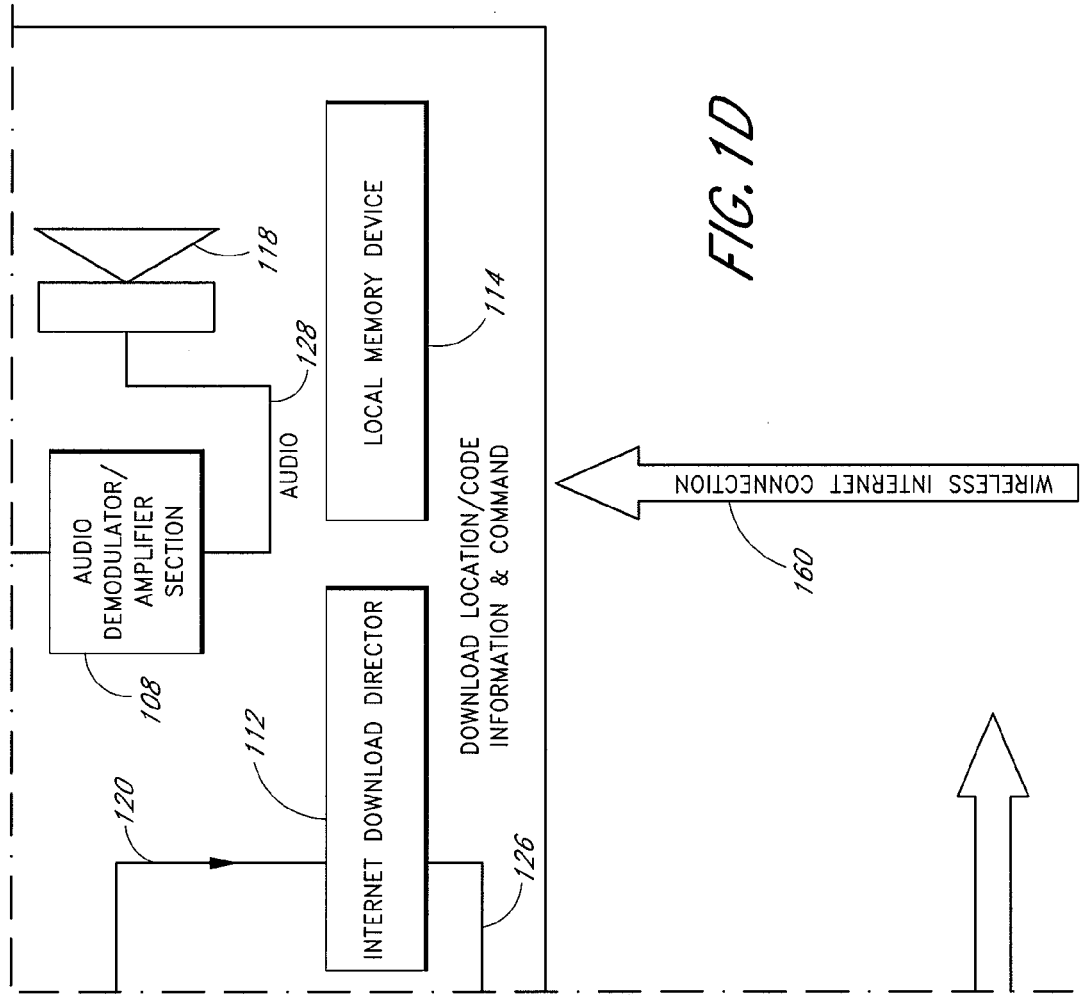

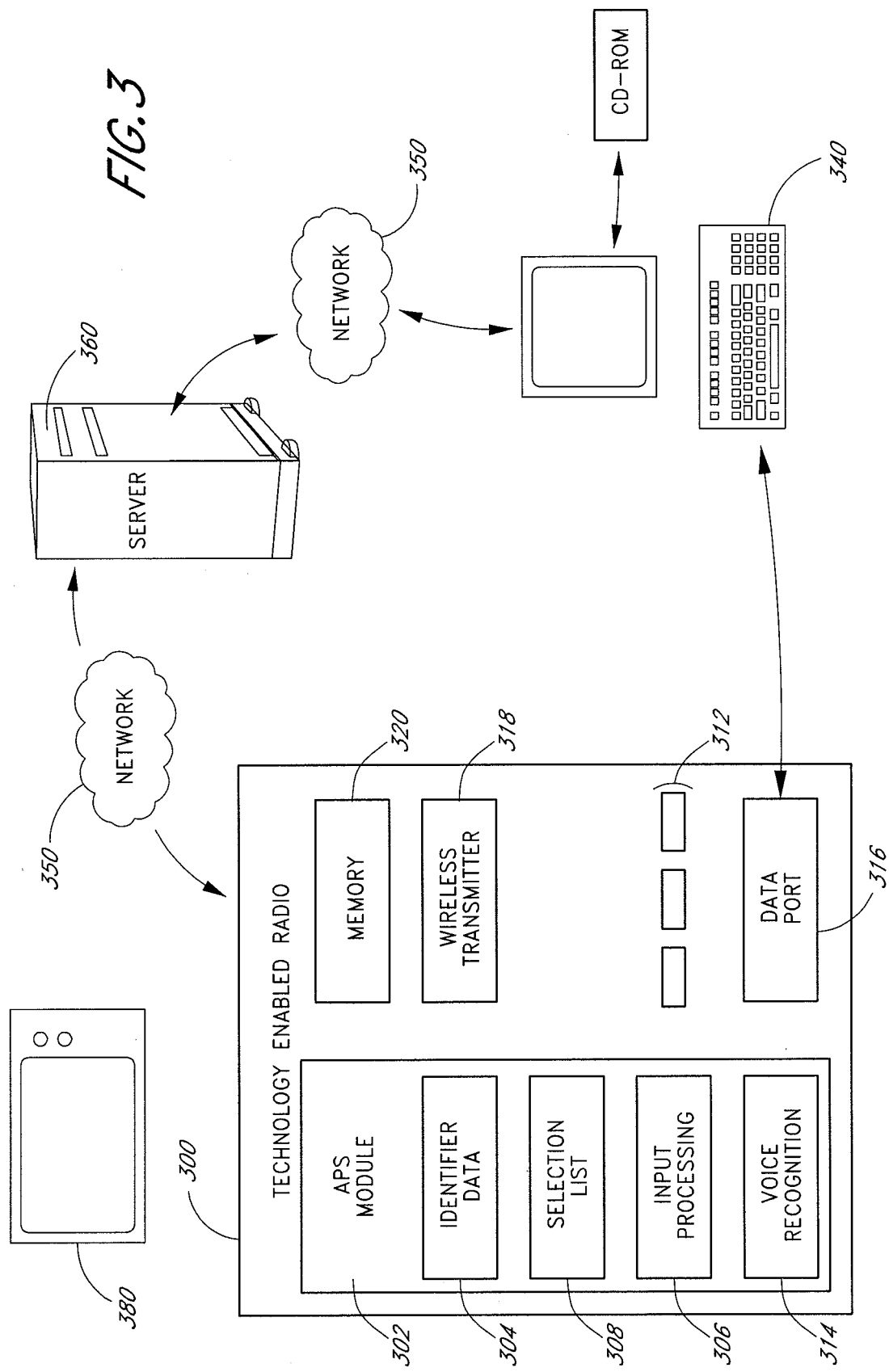

BROADCAST RESPONSE SYSTEM

CROSS-REFERENCE TO RELATED APPLICATIONS

This application is a continuation of application Ser. No. 11/203,556, filed Aug. 12, 2005, which is a continuation of application Ser. No. 09/953,335, filed Sep. 13, 2001, which claims the benefit of U.S. Provisional Application No. 60/232,333, filed Sep. 13, 2000, the content of which is hereby incorporated by reference in its entirety.

BACKGROUND OF THE INVENTION

1. Field of the Invention

This invention relates to processing responses to a broadcast.

2. Description of the Related Art

From the early days of FM broadcast transmission, stations have included ancillary signals such as background music or reading services for the blind along with a main carrier signal. The idea of transmitting data along with the main carrier signal caught on, and now many broadcast radio services either transmit an ancillary data signal or are developing a method to do so. The most current and widely used data transmission standard is the United States Radio Broadcast Data Systems ("RBDS") standard.

The RBDS standard, published by the National Radio Systems Committee and sponsored by the Electronics Industry Association and the National Association of Broadcasters, describes a system for broadcasting a variety of program-related information on a subcarrier of a standard FM broadcast channel. The RBDS standard teaches a system for transmitting station identification and location information, as well as time, traffic and miscellaneous other information.

The RBDS standard was designed to allow stations to send information such as call letters, station format, traffic alerts and scrolling text messages to compatible radios.

Many stations installed RBDS encoders through a program encouraged by the FCC in the early 1990's that provided encoders at no charge. Radio stations that did not participate in this "RBDS Roll-Out" can still obtain encoders at competitive prices.

RBDS encoders generate what is known as a "subcarrier" that modulates along with an FM station broadcast signal and can be demodulated by special decoders. The RBDS uses a subcarrier frequency of 57 khz. Commercially available RBDS encoders usually accept information via either serial or parallel data ports and format the information into the appropriate RBDS block type.

The RBDS data signal is a specially encoded text stream containing up to 32 repeating data "groups" transmitting at 1187.5 bits/second. The RBDS data signal does not require inclusion of all potential data group blocks of both repeating and unique data. One embodiment includes using one of several groups that are designed for data transmission functions.

An RBDS data group is composed of 4 blocks, each divided by checkwords used for error correction. Block 1 is a 4-digit Program Identification code (PI) which is derived from the transmitting station's call letters. Block 2 includes a 4-bit type code and a 1-bit group version code which identifies the type of information the data group contains. This block also contains a 1-bit code that identifies the transmitting station as one that broadcasts traffic information, followed by a 5-bit Program Type (PTY) code which describes the current program or format being broadcast by the station (Rock, Oldies, Talk, News, etc.). Information contained in Blocks 3 and 4 are dependent on the codes included in Block 2. Blocks 3 and 4 provide two 16-bit data slots where specific information can be sent to the special receiver.

For example, RBDS Group types 2A, use blocks 3 and 4 to transmit a 64-character text message known as RadioText (RT). This appears on RBDS-enabled radios as a scrolling message which some stations use to identify the song or program being broadcasted. Other group types use these blocks to identify alternate frequencies where the same programming can be available, in-house station text messages, or Emergency Alert System (EAS) communication messages. An extensive description of the RBDS standard is available through the National Association of Broadcasters and the National Radio Systems Committee.

A similar standard used in Europe is the European Radio Data System (RDS).

Broadcasters using the RBDS standard can distribute information to a large number of users. However, the standard does not allow individual users to respond to the broadcast information.

Currently, users listening to the radio or watching television may particularly like a song or program that they would like to purchase. While stations using RBDS/RDS may provide a user with the station call letters or the name of the song currently being broadcast, the user has no way to purchase the media at that point. Instead, the user must write down or remember the identifying information and then go to a store or online retailer to purchase the media. Not only is this inconvenient, but the user may forget the name of the song or not be able to find a store that sells the song. Additionally, the information provided by the radio station may not be enough to sufficiently identify the song. For example, the user may have the song title, but not the artist name, album name, or other necessary identifying information. Some material, such as editorial news broadcasts or live events, may not be available for purchase or may be difficult to find. Radio stations often have fund raising drives or listener surveys that require a listener to call the station or respond within a limited time. These same problems also apply to television and other forms of broadcast media.

SUMMARY OF THE INVENTION

The present invention solves these and other problems by providing a system that allows an individual user to respond to a data broadcast. In one embodiment, an Automatic Purchase System (APS) provides a radio broadcast listener with the ability to conveniently purchase media content such as music or speech while listening to the radio. Additionally, the user can respond to items in the radio broadcast such as advertisements, fund raising drives such as those conducted by public radio, or interactive listener polls during the broadcast.

In one embodiment, the user establishes a "Creative content" purchasing account with a wireless carrier. In one embodiment, a personal URL (web address) is assigned to the user to allow the user, for example, to monitor account activity, enable or disable APS software downloads, display premiums offered by sponsors, and manage and track content or APS purchases using a Technology Enabled Radio (TER) or a personal computer.

In one embodiment, the user makes routing choices between the TER or the web account for content. In one embodiment, the user selects the compression type, such as MP3, RA, Liquid Audio etc.

In one embodiment, each broadcaster has an RBDS/RDS or similar technology enabled server onsite to, for example, generate RBDS/RDS or equivalent code for inclusion in the broadcast, validate and route purchase information to the user's wireless carrier for billing, monitor online sales transactions for data mining, or route validated purchases to licensed creative content providers.

In one embodiment, radio hardware can include, for example, RBDS/RDS or equivalent decoder capability (e.g., in an internal chip with APS code); flash card slot and recording ability; or storage of multiple items such as artist name, song title, IP address of creative content provider, and time stamp for delayed purchase (e.g., in an internal chip with APS code).

In one embodiment, the system uses the RBDS/RDS to send a data stream in combination with a broadcast signal for identifying music or speech content available for purchase. A broadcast organization participating in the APS system is able to respond to requests for purchases placed by users who either click a button or issue a voice command to the radio at the time of the content was broadcast, at a later time by scrolling through the playlist stored in the APS module in the radio then selecting one or more items for purchase from the list stored in the radio, or by accessing a private web account via the Internet and downloading content to the personal computer. In one embodiment, purchases are made by saving requests for selected items for purchase on a flash card or storage technology and transferring that data to a personal computer for purchase through the Internet at a later time.

Data such as song title and artist, author or publisher and the IP address for the location where the digital version of the content is stored, can be transmitted using the RBDS/RDS data stream. A reference number representing song title and artist, author or publisher and the IP address for the location where the digital version of the content is stored can also be employed for ease of implementation. This reference number can reside in a lookup table to be accessed by the APS server software on a Data Server located at the broadcast site, a remote site or both for purposes of redundancy. Transmission of purchase requests from a Technology Enabled Radio (TER) is provided via wireless transmission, or by accessing the Internet using a personal computer or through a cellular or wireless phone. In one embodiment, activity of each sale using the above system is tracked for the purposes of aggregating data or "Data Mining" for sale to interested parties such as trade publications and record companies.

Portable radios can come equipped with a voice interface or a purchase button, a flash card or storage device and a port for connecting the radio to the personal computer such as a 9 pin serial, USB or wireless networking technology.

BRIEF DESCRIPTION OF THE DRAWINGS

FIG. 3 illustrates a television adapter that includes an automatic purchasing system module.

DETAILED DESCRIPTION OF THE PREFERRED EMBODIMENT

The present invention solves various problems in the prior art by providing a system that allows an individual user to respond to a data broadcast. In one embodiment, an Automatic Purchase System (APS) provides a radio broadcast listener with the ability to conveniently purchase media content such as music or speech while listening to the radio. Additionally, the user can respond to items in the radio broadcast such as advertisements, fund raising drives such as those conducted by public radio, or interactive listener polls during the broadcast.

One of ordinary skill in the art will recognize that there are various forms of media that can be broadcast. Where a specific type of media is used in the following examples, it is for demonstration purposes only and the examples should not be limited in that regard. Some examples of the various types of media can include music, songs, speech, text, video, etc.

Figure 1A:
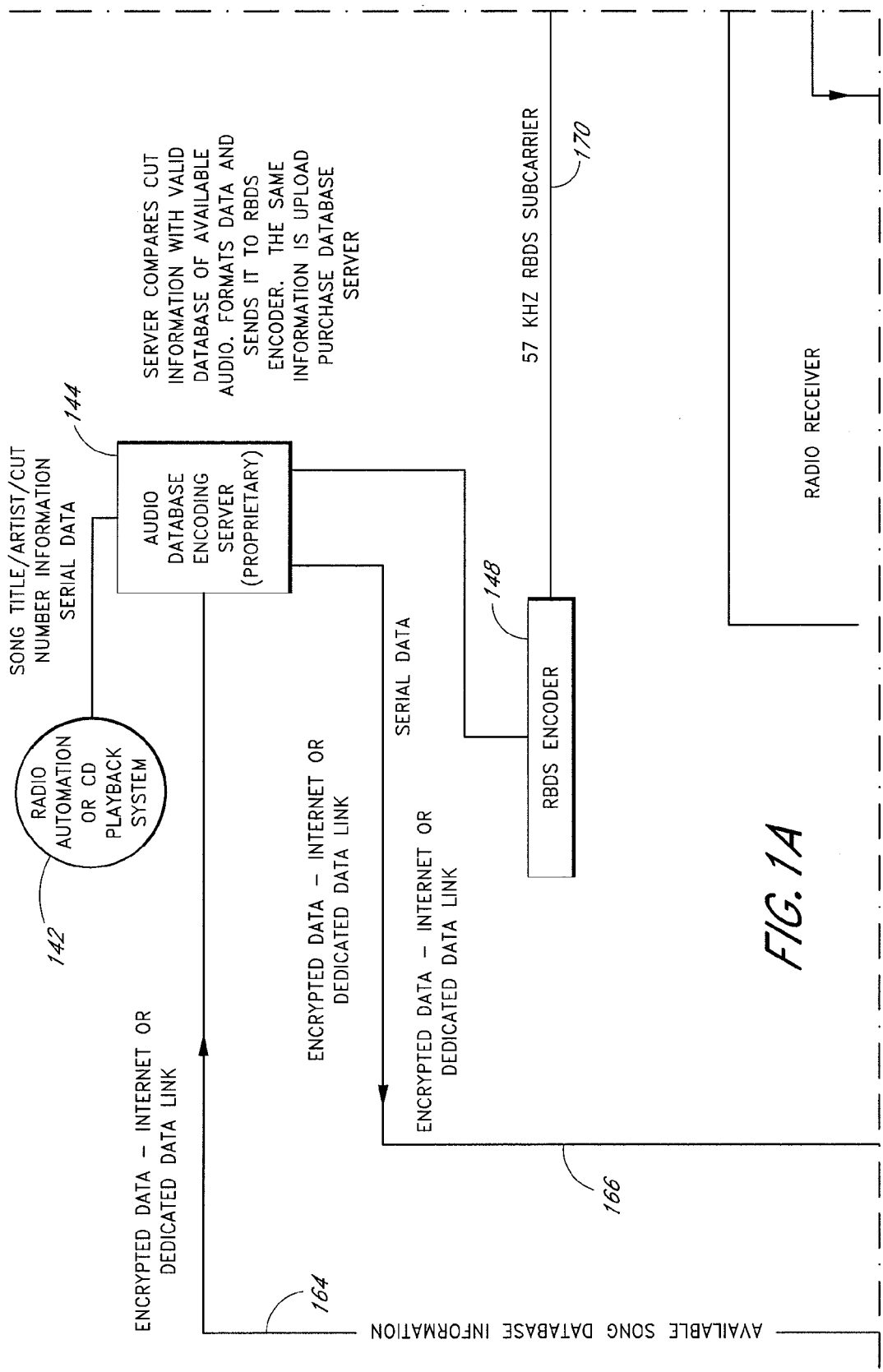
FIG. 1 illustrates an electronic purchasing system with a radio station that broadcasts information to individual radio receivers.
Figure 1C:
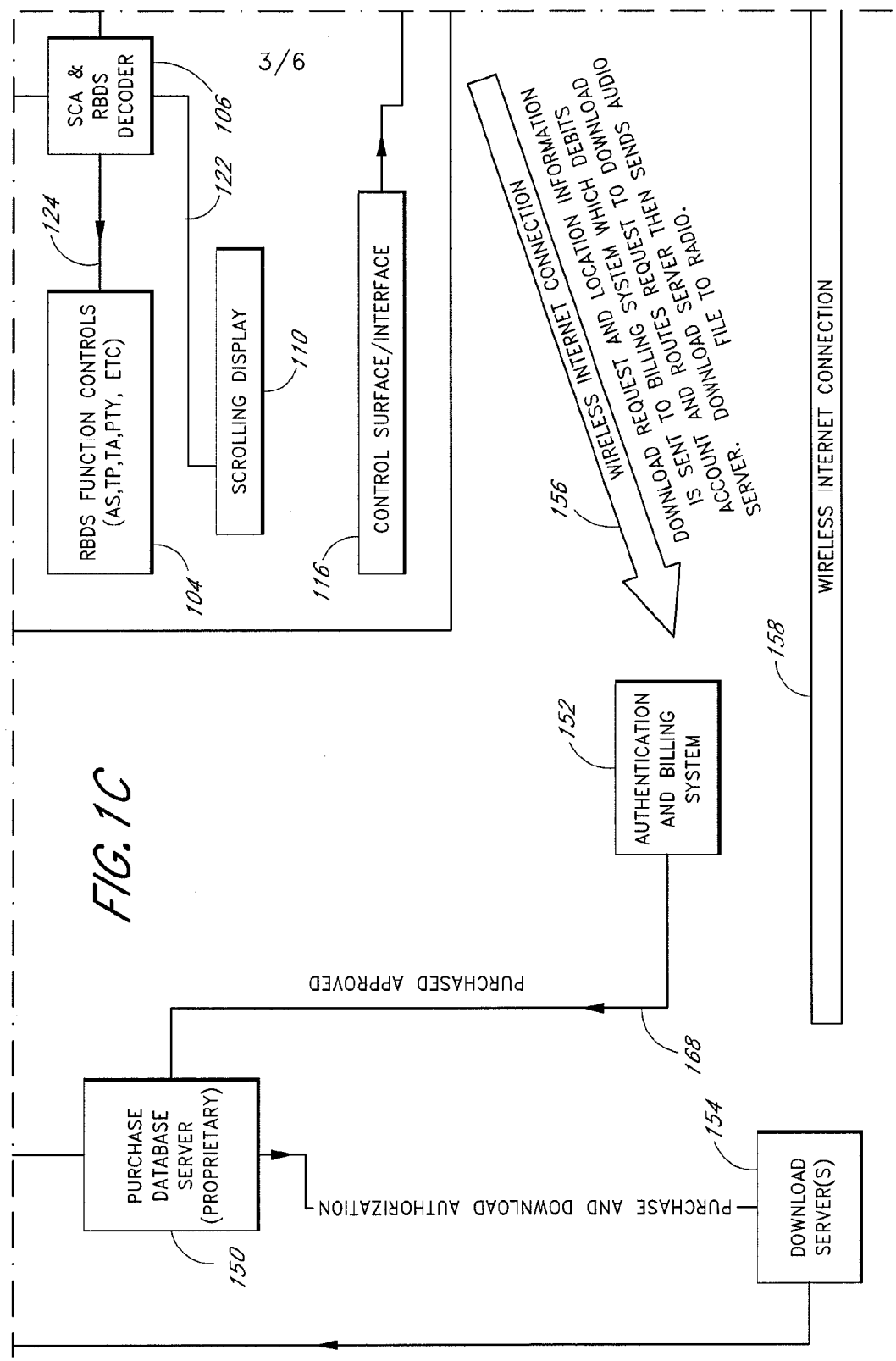

FIG. 1 illustrates one embodiment of a system that allows a user to respond to a data broadcast. FIG. 1 shows a radio station 140 that broadcasts information to a radio receiver 100. The radio receiver 100 has a control interface 116 that allows a user to initiate a purchase of music or products based on the radio station broadcast.

The terms RBDS/RDS are used throughout this document, but it should be understood other data standards can also be used. In one embodiment, the radio receiver 100 comprises a Radio Frequency (RF) Demodulator Section 102, a RBDS/RDS Decoder 106, a RBDS/RDS function control interpreter 104, an audio demodulator amplifier section 108, a scrolling display 110, an Internet Download Director 112, a local memory device 114 and the control interface 116. Additionally, the receiver 100 provides for audio output by transmitting an audio signal 128 from an audio demodulator amplifier section 108 to the speaker 118.

In one embodiment, the RF Demodulator Section 102 splits the signal into an audio signal and a data signal, with the data signal provided to the RBDS/RDS decoder 106 and the audio signal provided to the audio demodulator amplifier section 108. The RBDS/RDS decoder 106 parses the data signal from the RF Demodulator Section 102 and transmits the data to the RBDS/RDS Function Controller 104, the Scrolling Display 110, and the Internet Download Director 112.

The RBDS/RDS Function Controller 104 handles codes 124 sent using the RBDS/RDS standard. The codes 124 can, for example, include a Program Service name (PS), a Program Type (PTY), a Program Identification (PI), a Traffic Program (TP), a Traffic Announcement (TA), etc.

In one embodiment, the data is converted to an audio signal played on one or more speakers for the user to hear. A 64 character radio text message can be transmitted in five seconds under the RBDS standard, where a Type 2A group with 4 characters is transmitted 3.2 times a second.

In one embodiment, a pointer to an Open Data Applications (ODA) group is transmitted in a Type 3A group. The pointer, 16 message bits and 16 bit identifier (AID) are transmitted once a second.

In one embodiment, an ODA group with 37 usable bits is transmitted once a second during the broadcast of a "tagged" program. The ODA group can contain, for example, a song or commercial campaign identification.

In one embodiment, the scrolling display 110 receives display data 122 from the RBDS/RDS Decoder 106. The display data 122 can include information such as the program service name and program type, or it can include radio text information or messages displaying purchase options.

Additionally, the RBDS/RDS Decoder 106 provides data to the Internet Download Director 112 that includes instructions for the location of downloadable audio. For example, a radio station 140 can broadcast data regarding the current song that is playing, such as the song name, artist, album name, and year the song was recorded. The radio station 140 can also broadcast information providing a location where the song, editorial news broadcast, collection of songs, or other program material can be downloaded or purchased, and the purchase price for the song.

In one embodiment, a user can place an order to download a song using the control interface 116. The control interface 116 provides a download command signal 126 to the Internet Download Director 112. The Internet Download Director 112 can then provide download instructions such as, for example, the location of the file for download and the security procedures required for access. The download information is then transmitted over, for example, a wireless internet connection 156 to the authentication and billing system 152. The authentication and billing system 152 verifies the customer information and determines whether the customer account can be debited for the cost of the order. The authentication and billing system 152 then provides an approval signal 168 indicating whether the purchase was approved. The approval signal 168 is transmitted to the purchase database server 150.

Once the purchase is approved, the purchase database server 150 provides purchase and download authorization to the download server 154. The download server 154 can then transmit the requested material over a network connection 158. In one embodiment, the material is transmitted using a wireless internet connection directly to the radio receiver 100. In another embodiment, the material is made available to a personal computer. In one embodiment, the material is sent using traditional mail or parcel services. The download server 154 also communicates with the audio database and encoding server 144 to provide available sound database information 164.

The radio station 140 includes a radio automation or CD playback system 142, an audio database/encoding server 144, an FM transmission system 146 and a RBDS/RDS encoder 148. The radio automation or CD playback system 142 can extract information about songs or a radio program from the station playlist or by extracting information encoded on a CD or a CD-ROM. The playlist information is provided to the audio database and coding server 144. The playlist information can include the song title, artist, cut or other information. The audio database/encoding server 144 matches the information sent from the radio automation system 142 with information in the database. If there is an audio file available for download, the database/encoding server 144 formats the download information and sends it to the RBDS/RDS encoder 148. Corresponding information is uploaded to the purchase database server 150.

The RBDS/RDS encoder 148 transmits the RBDS/RDS information using the 57 khz RBDS/RDS subcarrier 170 to the FM transmission system 146. The RBDS/RDS subcarrier signal 170 is mixed by the FM transmission system 146 with the FM baseband program signal 172 and any other subcarriers. The FM transmission system 146 then transmits an FM RF signal 162 which is received by the radio receiver 100.

As shown in FIG. 1, a radio station 140, using either a standard radio automation system for tracking of music content which is being broadcast, or a data-enabled audio player, broadcasts audio material and synchronously sends RBDS/RDS or similar data to an APS server 144 that assigns a unique identifier to each specific broadcast segment or song.

The APS server 144 compares the broadcast segment identifier with a database 150 of audio available for purchase. If the broadcasted audio is available, the APS server 144 incorporates station call letter information, and an audio download location such as IP address and a file name into a data stream that is inserted into a radio station's broadcast using RBDS/RDS or similar technology. The information identifying the audio selected by the listener or user is routed to the APS Data Server and passed on to the location where a digital version of the audio content is stored and available for transfer to the end user. The user's radio receiver 100 receives and recognizes the encoded RBDS/RDS or other data and presents it on the radio display 110 notifying the user that the audio is available for purchase.

If the user elects to purchase the audio content or responds to an ad or "pledge" drive, a request including the station's data and the user's cell phone or wireless Electronic Serial Number (ESN) or other identifier, such as a credit card number, combined with the audio content information is issued by the radio and passed via the cellular or wireless phone transmission to the APS Data Server and finally routed to the source server at the record company, publisher or licensed content provider. If a "good" connection is not available using the wireless connection, or the user does not have a wireless account, the information can be stored on the internal flash card or other storage device 114 in the radio for transfer to a personal computer at a time of the user's choosing.

Each server typically records the purchase or response information. The storage server 154 at a source location then uploads the requested audio to the routing address associated with the user's cell phone account identifier. The user's receiver 100 then saves the audio on internal memory or a removable memory device or holds the audio content until the user chooses to download it using the Internet.

One embodiment includes the use of several group types reserved for "open data applications" by the RBDS/RDS standard. These groups were designed for use with data applications and are readily available for use.

Figure 2:
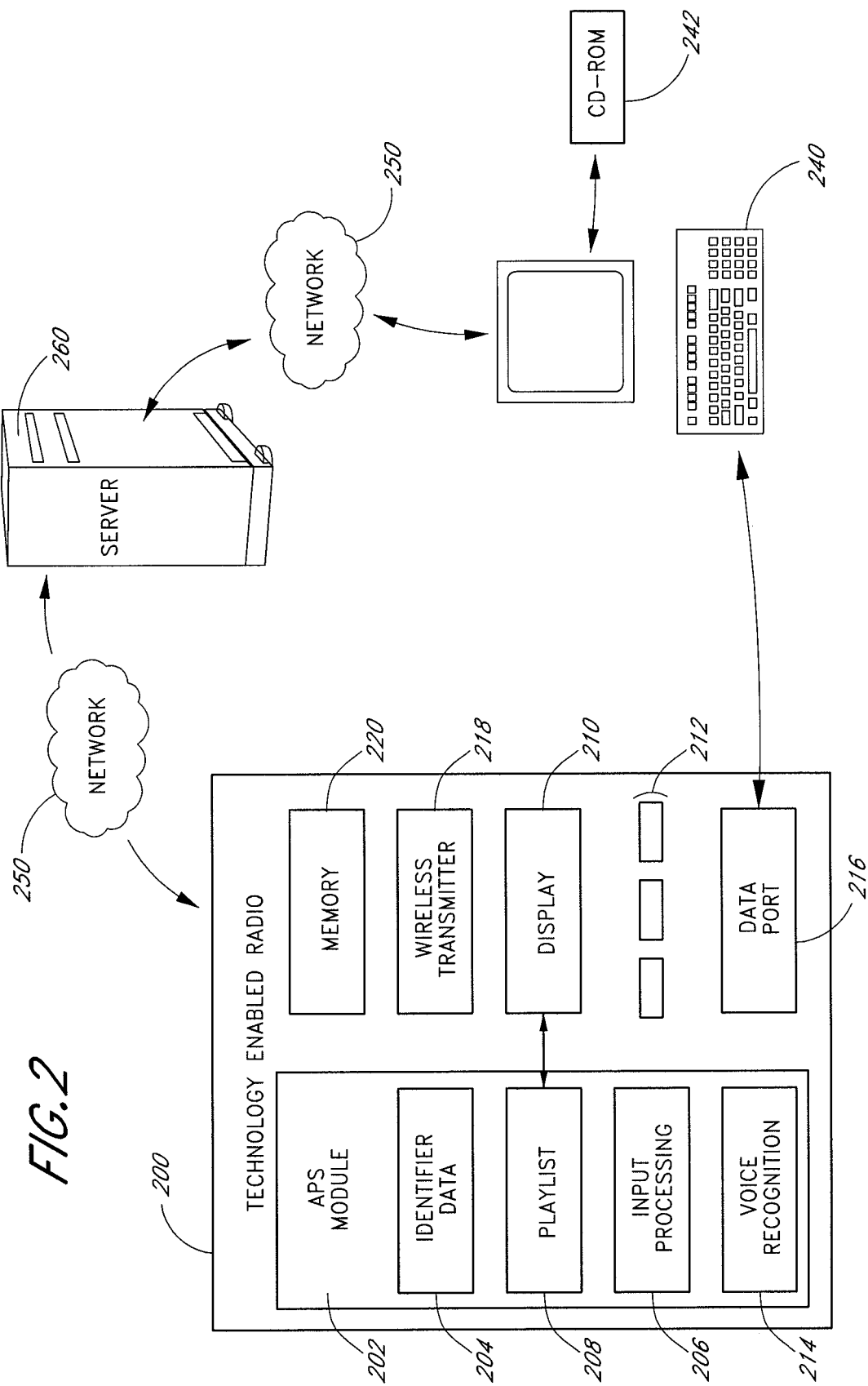
FIG. 2 illustrates a radio receiver that includes an automatic purchasing system module.

FIG. 2 shows one example of a technology enabled radio 200. The radio 200 includes a module 202 for the Automatic Purchase System. In one embodiment, the APS provides relatively quick delivery of the purchased material. In one embodiment, quick delivery is provided by wireless transmission such that the user can receive the purchased material while traveling. In one embodiment, the system also provides delayed delivery, when, for example: the user so chooses; the user does not have a wireless account; or the user cannot obtain a good signal with a wireless connection for transmission.

In one embodiment, the radio 200 contains an APS module 202 configured to store identifier data 204, to provide security functions, and to assist in routing selections made by the user (using either a voice command issued to voice recognition technology 214 contained in the radio or by the press of a button 212 on the radio interface). In one embodiment, the APS module 202 is a proprietary microchip (or portion of a microchip) that implements the radio receiver-side functions of the APS. In one embodiment, the APS module 202 is a software module that runs on a processor in the radio 200.

The audio content can also be "tagged" for delayed purchase at a later time by scrolling through the playlist 208 stored in the APS module 202 on the radio 200 and presented on the external display 210 of the radio 200. The user can then select one or more items for purchase from the list presented on the display 210 (stored in the APS module 202 in the radio). In one embodiment, the selected items are transmitted using a wireless transmitter 218 such as a wireless telephone. In another embodiment, a user can store the playlist 208 on removable memory 220 that is readable by a personal computer 240. The user can then access a private web account via the Internet for downloading the content to the personal computer 240. At this point, the user can transfer the downloaded content to a storage device 242 such as, for example, a flash card or CD-ROM.

Non-automotive or portable radios containing the APS module 202 can also include either a voice interface 214, an interactive button 212, or both, to enable listener-selection of broadcast material (or for responding to advertisements, fund raising drives, or any other interactive event). A port 216 such as a 9-pin serial port, a USB port, or any other port designed to provide connectivity between the radio 200 and a personal computer 240 can also be integrated into the radio 200 for the purposes of transferring the selection list from the APS module 202 to software in a personal computer 240 or other device. APS software running on the personal computer 240 is configured to recognize an embedded security code enabling purchase of the selected material via the Internet, or respond to an advertisement or fund raising drive. Wireless technology, such as, for example, BlueTooth and the like, can also be used for the purposes of transferring the selection data between devices.

Automotive radios equipped with the APS module 202 and associated technologies can use a wireless interface 218 to send a purchase request (or interactive response) complete with a user Electronic Serial Number (ESN), WIN identifiers, and routing information such as artist and song title derived from the RBDS/RDS data string accompanying the associated broadcast. The purchase request and routing information can then be directed to an APS server 260 for processing, billing approval, and delivery of the content to a particular location (such as the user's flash card or storage technology in the radio 200 or a personal account web URL), as requested by the user.

The flash card or storage technology 220 in the automotive radio offers the user a second option. The user can select content for purchase using the interactive voice technologies 214 or the button interface 212 to select broadcast content for purchase. If that user does not have a wireless phone, or does not have a good connection with a wireless phone connected to the radio, then the content selections can be stored on the flash card or storage technology 220 for later use.

In one embodiment, the APS polls the wireless network until a good connection is obtained, at which point the selection data is transferred for completion of the transaction. In cases where the user cannot obtain a good connection or the user does not have a wireless account, the flash card or storage technology 220 can later be removed by the user and inserted into a personal computer 240. The routing information for each selection stored on the flash card or storage technology 220 is passed to the APS download software running on the user's personal computer 240. Once the user has an active connection to the Internet, the APS download software allows the user to purchase the selected content and download it to a personal computer 240 as long as the content was tagged with the proper security codes obtained from the APS module 202 in the radio 200.

Using this system, the user can respond to a live broadcast radio advertisement to qualify for coupons, premiums or other sponsor-offered rewards. This system can also be applied to pledge drives employed by public radio stations, allowing listeners to pledge money while driving or listening to a portable radio. The system can also be used for listener polls where the broadcaster can obtain quick responses from listeners to new music, speech content or general questions such as a talk show format. In each case, the user/listener can respond by pressing a "Respond" button 212 on the radio 200. On a voice-enabled radio 200, the user/listener can order content or provide responses by voice commands.

The user can also receive offers or hyperlinks posted on a personal web site presenting premiums such as discounted tickets (to events for the artists or writers for which they purchased content), suggestions of purchase for related artists or music genres, record company club offerings, or other premiums. Associated books, magazine articles, merchandise and event information can also be posted for the user to purchase using the APS. Hyperlinks can also be present for content not available on the radio but provided either through partnerships with existing digital content providers or content owners who have made direct arrangements for digital distribution through the APS web site.

Billing for the purchase of content and user-identification can be managed through the user's wireless phone account or the user can establish an account at an APS web site. Content purchased can be directed to Technology-Enabled Radios (TERs), or receivers using a wireless-telephone transmission, and stored on a flash card. Purchase content can also be directed to a personal web page assigned to the user upon creation of a specific account. The user can access the account over the Internet, and the user can download purchased content to a personal computer.

In order to protect the purchased content from piracy, various access-rights controls and copy-protections can be provided. In one embodiment, the user is allowed to copy purchased content to a CD or flash card one time only (unless additional licenses are purchased). Additional licenses can be purchased within the APS download software or in the user's web account by the click of a button or through using a third-party software package enabled with the APS security keys such as the ESN and WIN numbers from a wireless account.

Each sales transaction can be monitored by an APS server located at each participating radio station, by an Internet-based APS server, or both. The data collected through "data mining" of sales transactions can be sold to companies interested in tracking demographic information and music sales such as record companies and trade publications. In one embodiment, personal information regarding the users is not disclosed.

The system may include features such as allowing the user to establishes a "Creative content" purchasing account with a wireless carrier.

The system may also provide a personal URL (web address) to a user, with one or more web pages that allow a user to, e.g., monitor account activity; enable or disable APS software downloads; display premiums offered by sponsors; manage and track content or APS purchases using a technology-enabled radio or a personal computer; make routing choice between a technology-enabled radio or the web account for content; and/or select compression type (e.g., MP3, RA, Liquid Audio etc.).

In one embodiment, a broadcaster has an RBDS/RDS or similar technology enabled server onsite to, e.g., generate RBDS/RDS or equivalent code for inclusion in the broadcast; validate and route purchase information to the user's wireless carrier for billing; monitor online sales transactions for data mining; and/or route validated purchase to licensed creative content providers.

Radio hardware may also have various features such as RBDS/RDS or equivalent decoder capability (e.g., in an internal chip with APS code); flash card slot and recording ability; and/or storage capacity to store items such as artist name, song title, IP address of creative content provider, and/or time stamp for delayed purchase (e.g., in an internal chip with APS code).

In one embodiment, the system uses the RBDS/RDS to send a data stream in combination with a broadcast signal for identifying music or speech content available for purchase. A broadcast organization participating in the APS system is able to respond to requests for purchase placed by users who either click a button or issue a voice command to the radio at the time of the content was broadcast, at a later time by scrolling through the playlist stored in the APS module in the radio then selecting one or more items for purchase from the list stored in the radio, or by accessing a private web account via the Internet and downloading content to the personal computer. In one embodiment, purchases are made by saving requests for selected items for purchase on a flash card or storage technology and transferring that data to a personal computer for purchase through the Internet at a later time.

Data such as song title and artist, author or publisher and the IP address for the location where the digital version of the content is stored, can be transmitted using the RBDS/RDS data stream. A reference number representing song title and artist, author or publisher and the IP address for the location where the digital version of the content is stored can also be employed for ease of implementation. This reference number can reside in a lookup table to be accessed by the APS server software on a Data Server located at the broadcast site, a remote site or both for purposes of redundancy. Transmission of purchase requests from a Technology Enabled Radio (TER) is provided via wireless transmission, or by accessing the Internet using a personal computer or through a cellular or wireless phone. In one embodiment, activity of each sale using the above system is tracked for the purposes of aggregating data or "Data Mining" for sale to interested parties such as trade publications and record companies.

Portable radios can come equipped with a voice interface or a purchase button, a flash card or storage device and a port for connecting the radio to the personal computer such as a 9 pin serial, USB or wireless networking technology.

Music radio stations often depend on computer-programmed and optimized playlists to ensure consistency and success of the format. Many stations use computer-based playback systems that play from hard disc libraries or control CD changers. At the start of the day, a playlist is loaded into these computers that include information. These "automation" systems provide continual logging of finctions and activities and can output the "as played" information in a variety of ways, such as serial data. Data can be taken as an event occurs or can be read from a text file. Most automated systems can be programmed to send information out of the serial port.

Some stations have used this data to use RBDS/RDS and display song information in the RadioText group. More recently stations are using this information to feed a "now playing" message on Internet web sites.

Even stations that play CD's manually from a paper playlist can provide the information needed. Professional CD players usually have serial ports (i.e. RS232, RS485) that can be programmed to transmit CD code information. This code information is similar to the song codes used by internet-enabled computers to automatically download song information from the website known as CDDB.com for a CD inserted into a CD-ROM player. Every RIAA-registered CD has a unique registered code with the RIAA. Thus, on an RIAA registered CD, a song can be identified by the registered code number in combination with the track number. For content that is not registered with the RIAA, a registration code is provided by APS. In one embodiment, the broadcaster providing the APS service to its listeners assigns an identifier code to the content. In one embodiment, an identifier code for non-RIAA registered content is provided by an APS registering organization or service.

In one embodiment, the system operates by acquiring playlist data or a reference number that identifies the broadcast content. The playlist data is included in the RBDS/RDS data sub-carrier by either the APS server software or a combination of the APS server software in conjunction with a compatible RDS/RBDS encoder.

Once the data source is identified, a connection pathway is established between the broadcaster and the APS Data Server. APS software residing on the APS Data Server stores that information in a "look up" table. The codes representing "cut numbers", or text song information such as artist and song title, are referenced against the internal look up table to determine if the song is available for download from the content owner such as a music publisher or record company. Once determination has been made regarding availability of the requested content, the APS software residing on the APS Data Server builds the data stream that can include the group 3 and group 4 data of the RBDS/RDS standard containing download location and/or file name. The APS software then transmits the information to a compatible RDS/RBDS encoder residing at the participating broadcaster.

For example: the 64-character text space contained in the RBDS standard is long enough to include an Internet IP address and directory location or reference code contained in a look up table capable of enabling the APS software to route the request for purchase from a user to the appropriate download site such as a publisher, record company or news organization.

The APS software residing on the APS Data Server can be employed to create the complete RBDS/RDS data signal and feed a slave encoder located at each broadcast location. The APS software also tracks each inquiry and purchase for billing verification and crediting the broadcaster for payment for their part in the sale. The APS software also conducts data mining tracking for purposes of the future sale of transaction data.

In one embodiment, the RBDS/RDS encoder formats and encodes the non-APS elements of the data stream (such as station identification (Call Letters), date and time, etc.) and the APS software on the APS Data Server inserts content-specific data such as song title and artist information or author and news service, into the continual RBDS/RDS data stream through the RBDS/RDS encoder's standard interfaces. The APS Data Server software can be well suited to provide content specific information but the other RBDS/RDS group applications can be better managed by broadcast equipment designed for those applications.

RBDS/RDS is an FM-only transmission system but one of ordinary skill in the art will recognize that APS data can be included with other radio services (e.g. AM, etc.).

Digital Audio Broadcasting (DAB), which includes flexible, open-source, data transmission functions along with the audio signal. Systems for adapting digital audio and data transmission to the current allocation of AM and FM stations using a technique known as In Band On Channel (IBOC) are known. IBOC includes an ancillary data stream in the broadcast signal (e.g. the ancillary signal stream is multiplexed with the broadcast signal stream) to be used by the station for whatever purposes they see fit. The ancillary data stream signal can be used to carry APS information.

Other developing radio systems also include a data path that can be used to send the information used by the APS system to successfully allow the acquisition of music or other material being broadcast. Satellite DAB providers, such as XM Satellite and Sirius Satellite Radio, have access to the audio and ancillary data signals being sent to compatible receivers.

As other audio services develop, the capability to transmit complimentary, simultaneous data can be used as a component of the APS. The APS can be simply adapted to each new transmission form with no significant change in the overall system.

Wireless technology and the related developments in high-speed Internet access using systems such as BlueTooth or other wireless network technology allows faster downloads of the desired material by taking advantage of the newer, faster technology.

NTSC, PAL and other technologies employed to transmit television signals around the world allow for similar capabilities in transmitting subcarrier data within the carrier signal.

FIG. 3 shows one example of a Technology Enabled Television (TET) adapter 300. The television adapter 300 includes a module 302 for the Automatic Purchase System. In one embodiment, the television adapter 300 is incorporated into the television. In one embodiment, the television adapter 300 is a settop box. In one embodiment, the APS provides relatively quick delivery of the purchased material. The material available for purchase can cover a wide range of products, such as music, video, print, pledges of money, or consumer goods related to displayed advertisements. In one embodiment, quick delivery is provided by using a cable modem. In one embodiment, the television adapter 300 uses a modem and a telephone connection to download the data. In one embodiment, the television adapter 300 uses a network connection to download the data. In one embodiment, the system provides delayed delivery, when, for example: the user so chooses; the user does not have a cable modem; the user does not have a network account at that location; or the user cannot obtain a good signal with a wireless connection for transmission.

In one embodiment, a television adapter 300 contains an APS module 302 configured to store identifier data 304, to provide security functions, and to assist in routing selections made by the user (using either a voice command issued to voice recognition technology 314 contained in the television adapter or by the press of a button 312 on the television adapter interface). In one embodiment, the APS module 302 is a proprietary microchip (or portion of a microchip) that implements the television adapter-side functions of the APS. In one embodiment, the APS module 302 is a software module that runs on a processor in the television adapter 300.

The material can also be "tagged" for delayed purchase at a later time by scrolling through the selection list 308 stored in the APS module 302 on the television adapter 300 and presented on the external television display 380. The user can then select one or more items for purchase from the list presented on the display 380 (stored in the APS module 302 in the television adapter). In one embodiment, the selected items are transmitted using a cable modem. In one embodiment, the selected items are transmitted using a wireless transmitter 318 such as a wireless telephone. In another embodiment, a user can store the selection list 308 on removable memory 320 that is readable by a personal computer 340. The user can then access a private web account via the Internet for downloading the content to the personal computer 340. At this point, the user can transfer the downloaded content to a storage device 342 such as, for example, a flash card or CD-ROM.

A port 316 such as a 9-pin serial port, a USB port, or any other port designed to provide connectivity between the television adapter 300 and a personal computer 340 can also be integrated into the television adapter 300 for the purposes of transferring the selection list from the APS module 302 to software in a personal computer 340 or other device. APS software running on the personal computer 340 is configured to recognize an embedded security code enabling purchase of the selected material via the Internet, or respond to an advertisement or fund raising drive. Wireless technology, such as, for example, BlueTooth and the like, can also be used for the purposes of transferring the selection data between devices.

In one embodiment, television adapters equipped with the APS module 302 and associated technologies can use a wireless interface 318 to send a purchase request (or interactive response) complete with a user Electronic Serial Number (ESN), WIN identifiers, and routing information such as artist and song title derived from the RBDS/RDS data string accompanying the associated broadcast. In one embodiment, television adapters can use a modem (e.g. a telephone modem, cable modem, etc.) or other network connection to send a purchase request. The purchase request and routing information can then be directed to an APS server 360 for processing, billing approval, and delivery of the content to a particular location (such as the user's flash card or storage technology in the television adapter 300 or a personal account web URL), as requested by the user. In one embodiment, the purchased material is delivered with traditional mail or parcel services.

The flash card or storage technology 320 in the television adapter offers the user a second option. The user can select content for purchase using the interactive voice technologies 314 or the button interface 312 to select broadcast content for purchase. If that user does not have a network connection, then the content selections can be stored on the flash card or storage technology 320 for later use.

User access to the APS is provided by the remote control, voice interaction or buttons on the actual TV. As a user views broadcast content, the user can respond to the television broadcast to make purchases, respond to an advertisement, to qualify for premiums, or the user can respond to pledge drives on public television or an interactive event such as a talk or game show.

In one embodiment, the user responses are provided to a computing device such as a personal computer, set-top box, and the like (e.g., via flash card or other removable storage medium, via a network connection between the computer and the TET, via a wireless connection such as BlueTooth, etc.). The computing device is then used to transfer the content in a manner similar to that described in the radio embodiment above.

In one embodiment, a cable connection from the TET to the computing device is used for immediate transfer of the user response. In one embodiment, data is transferred between the TET and the computing device using a communication port such as, for example, a serial port, a USB port, infrared port, a parallel port, and Ethernet port, or other port technology.

In one embodiment, the APS module also provides web-enabled cable or satellite television interactive services. In one embodiment, a modem (such as, for example, a cable modem) is included in the TET thereby allowing the TET to send a user response request directly to a content provider (such as a cable company). In one embodiment, the APS module is provided in a cable set-top box to allow the APS system to be used with a conventional television.

The mechanisms for routing, customer identification, security, tracking, and purchase used with the radio embodiments described above can also be used with the TET.

It is understood that the download server, purchase database server, audio database server and encoding server can reside on one or more computers, and that the shown organization of the servers is for clarification. One or more programs can be used to perform part or all of the functions described in this description.

The foregoing description of a preferred implementation has been presented by way of example only, and should not be read in a limiting sense. Although this invention has been described in terms of certain preferred embodiments, other embodiments that are apparent to those of ordinary skill in the art, including embodiments which do not provide all of the benefits and features set forth herein, are also within the scope of this invention. Accordingly, the scope of the present invention is defined only by reference to the appended claims.

What is claimed is:

1. A communications device configured to generate a response data packet corresponding to a specific occurrence of a media broadcast segment, the communications device comprising:
   a broadcast receiver circuit configured to detect the specific occurrence of the media broadcast segment conveyed in a first transmission;
   a data receiver circuit configured to extract identifying data from a second transmission, at least a portion of the identifying data comprising unique data configured to enable unique identification of the specific occurrence of the media broadcast segment;
   memory that stores the identifying data comprising the unique data that configured to enable unique identification of the specific occurrence of the media broadcast segment;
   an output module that presents at least one entry based at least partly on the identifying data;
   an input control that allows a selection of at least one entry from the output module; and
   a communication module that communicates at least a result of the selection in the response data packet to a response authentication system, the response data packet comprising at least an identification of a responder and the unique data configured to enable unique identification of the specific occurrence of the media broadcast segment, the identification of the responder comprises information related to at least one of the following: a wireless telephone account, a private account, account billing details.

2. The communications device of claim 1, wherein the first transmission comprises at least one of the following: an audio transmission, a video transmission.

3. The communications device of claim 1, wherein the first transmission and the second transmission comprise at least one of the following: multiplexed data, subcarrier data.

4. The communications device of claim 1, wherein the first transmission is discrete from the second transmission.

5. The communications device of claim 1, wherein at least a portion of the identifying data identifies actions available to the responder.

6. The communications device of claim 1, wherein the extraction of the identifying data occurs from at least one block of an Open Data Application group.

7. The communications device of claim 1, wherein the communication module communicates the response data packet using at least one of the following: a text message over a wireless network, an Internet Protocol data packet, a communications cable, a wireless transmission, a removable media.

8. The communications device of claim 1, wherein the communicated result to the response authentication system is associated with at least one of the following: an advertisement, a discount offer, a coupon offer, a reward program offer, an event offering, music, and a news report.

9. The communications device of claim 1, wherein the communication module receives a communication from the response authentication system.

10. The communications device of claim 9, wherein the communication from the response authentication system is received by a second device discrete from the communications device.

11. The communications device of claim 10, wherein the different second device was pre-selected by the responder.

12. The communications device of claim 10, wherein the communication to the response authentication system further includes a selection of the second device.

13. The communications device of claim 1, wherein the response data packet further includes an identification of a source of the first transmission.

14. A method comprising:
   extracting, by a communication device, a data packet from a first transmission stream, at least a portion of the data packet comprising unique data configured to enable unique identification of a specific occurrence of a media broadcast segment;
   storing unique data configured to enable unique identification of the specific occurrence of the media broadcast segment;
   presenting, on the communication device, at least one entry derived from the data packet;
   receiving a selection of the at least one entry; and
   communicating at least a result of the selection as a response data packet to a response authentication system, the response data packet comprising at least an identification of a responder and the unique data configured to enable unique identification of the specific occurrence of the media broadcast segment, the identification of the responder comprises information related to at least one of the following: a wireless telephone account, a private account, account billing details.

15. The method of claim 14, wherein the response data packet is tracked through data mining.

16. The method of claim 14, wherein least one of the following is generated from the first transmission: audio, video.

17. The method of claim 14, wherein more than one entries are derived from the data packet and presented on the communication device.

18. The method of claim 14, wherein the first transmission and the second transmission comprise at least one of the following: multiplexed data, subcarrier data.

19. The method of claim 14, wherein the first transmission is discrete from the second transmission.

20. The method of claim 14, wherein the extracted data packet identifies available actions.

21. The method of claim 14, wherein the extraction of the data packet occurs from at least one block of an Open Data Application group.

22. The method of claim 14, wherein said communicating further comprises transmitting data using at least one of the following: text messaging over a wireless network, an Internet Protocol data packet, a communications cable, a wireless transmission, a removable media.

23. The method of claim 14, wherein said communicating is associated with at least one of the following: an advertisement, a discount offer, a coupon offer, a reward program offer, an event offering, music, and a news report.

24. The method of claim 14 further comprising, receiving a response back from the response authentication system to the responder.

25. The method of claim 24, wherein the response from the response authentication system is received on a second device discrete from the communication device.

26. The method of claim 25, wherein the second device was pre-selected by a response generated by a user using the communications device.

27. The method of claim 25, wherein the response data packet includes a selection of the second device.

28. A system enabling a communications device to respond to reception of a broadcast comprising at least a media broadcast segment, the media broadcast segment associated with unique data that enables unique identification of a specific occurrence of the media broadcast segment, the system comprising:
- a data extraction module configured to extract at least the unique data that enables unique identification of the specific occurrence of the media broadcast segment;
- memory configured to store at least the unique data that enables the unique identification of the specific occurrence of the media broadcast segment;
- an input interface configured to detect a selection of at least one entry responsive to the specific occurrence of the media broadcast segment;
- a responder identification module configured to extract from the communications device data that enables an identification of a responder and associate the data that enables the identification of the responder with the selection, the identification of the responder comprises information related to at least one of the following: a wireless telephone account, a private account, account billing details;
- a response packet module configured to create a data packet comprising at least the unique data that enables the unique identification of the specific occurrence of the media broadcast segment and the data that enables the identification of the responder; and
- a communication module configured to communicate at least the data packet to an authentication system in response to the detection of the selection associated with the specific occurrence of the media broadcast segment.

29. The system of claim 28, wherein the unique data that enables the unique identification of the specific occurrence of the media broadcast segment is sourced from a database.

30. The system of claim 29, wherein the database and the authentication system are managed by discrete entities.

31. The system of claim 28, wherein the communications device comprises at least one of the following: a mobile phone, a digital media player, a radio, a television, a computing device.

32. The system of claim 28, wherein the data that enables the identification of the responder enables identification of at least one of the following: a user of the communications device, the communications device, account billing details, user demographic data.

33. The system of claim 28, further comprising an output interface that presents at least one of the following: a title of the media broadcast segment, an artist associated with the media broadcast segment, a retailer associated with the media broadcast segment, a broadcaster associated with the media broadcast segment, an advertisement associated with the media broadcast segment.

34. The system of claim 28, wherein the unique data that enables unique identification of the specific occurrence of the media broadcast segment is contained within at least one block of an Open Data Application group.

35. The system of claim 28, wherein the data extraction module is further configured to extract: data that identifies available actions, data that identifies a third party service provider, data that identifies an advertiser, data that identifies the media broadcast segment.

36. The system of claim 28, wherein the data packet is tracked through data mining.

* * * * *

UNITED STATES PATENT AND TRADEMARK OFFICE
CERTIFICATE OF CORRECTION

PATENT NO.       : 8,467,724 B2
APPLICATION NO.  : 11/562300
DATED            : June 18, 2013
INVENTOR(S)      : Kelly M. Christensen et al.

Page 1 of 1

It is certified that error appears in the above-identified patent and that said Letters Patent is hereby corrected as shown below:

On the Title Page

In column 2 (page 2 item 56) at line 19, Under Other Publications, change "prosection" to --prosecution--.

In the Specifications

In column 9 at line 44, Change "finctions" to --functions--.

In the Claims

In column 13 at line 28, In Claim 1, change "data that" to --data--.

Signed and Sealed this
Twenty-fourth Day of December, 2013

Margaret A. Focarino
*Commissioner for Patents of the United States Patent and Trademark Office*